(12) United States Patent
Donham

(10) Patent No.: US 6,646,648 B1
(45) Date of Patent: Nov. 11, 2003

(54) METHOD AND SYSTEM FOR EVALUATING DERIVATIVES IN SCREEN SPACE USING PERSPECTIVE CORRECTED BARYCENTRIC COORDINATES

(75) Inventor: Christopher Donham, San Mateo, CA (US)

(73) Assignee: Microsoft Corporation, Redmond, WA (US)

( * ) Notice: Subject to any disclaimer, the term of this patent is extended or adjusted under 35 U.S.C. 154(b) by 308 days.

(21) Appl. No.: 09/675,979

(22) Filed: Sep. 29, 2000

(51) Int. Cl.$^7$ ................................................. G09G 5/00
(52) U.S. Cl. ...................................................... 345/582
(58) Field of Search .................................. 345/428, 581, 345/582, 583, 584, 586, 587, 606, 103 FOR, 210 FOR, 211 FOR; 701/212

(56) References Cited

U.S. PATENT DOCUMENTS

| | | | | |
|---|---|---|---|---|
| 5,361,386 A | * | 11/1994 | Watkins et al. | 395/130 |
| 5,602,979 A | * | 2/1997 | Loop | 395/123 |
| 6,232,981 B1 | * | 5/2001 | Gossett | 345/430 |

* cited by examiner

Primary Examiner—Matthew C. Bella
Assistant Examiner—G. F. Cunningham

(74) Attorney, Agent, or Firm—Woodcock Washburn LLP

(57) ABSTRACT

Method and system for evaluating derivatives in screen space using perspective corrected barycentric coordinates. A preferred embodiment provides a method for computing the LOD at individual pixels directly without relying on approximations. In this embodiment, screen coordinates of a pixel and derivatives of the texture coordinates at the vertices of the triangle enclosing the pixel are determined. Derivatives of texture coordinates at the pixel with respect to screen space are evaluated by interpolation of the derivatives of the texture coordinates at the vertices using barycentric coordinates of the pixel. Then, using the derivatives of the texture coordinates and without relying on neighboring pixels' texture coordinates, the LOD at the pixel is computed, such that the LOD as computed is unbiased in any particular direction. Significantly, such direct computation allows exact LOD values to be easily computed and eliminates the artifacts that are inherent in prior art implementations. This embodiment also enables a higher level of parallel processing by eliminating the prerequisite of computing texture coordinates before computing LOD, thereby enhancing system performance. Another embodiment provides a method for computing derivatives of a function with respect to screen space, where the function can be interpolated in eye space by perspective corrected barycentric coordinates for a point in screen space. The method of this embodiment can be used to evaluate any $n^{th}$-order derivative where n is a positive integer.

20 Claims, 11 Drawing Sheets

Define $a$, $b$, and $c$ as the barycentric coordinates for a point $P$ inside a triangle.

Let A, B, and C be the coordinates of the triangle in screen space. The area of the triangle is $1/2k$ where $k = |\vec{AC} \times \vec{BC}|$. The barycentric coordinates $a$, $b$, and $c$ can then be written as:

$$a = \frac{|\vec{PC} \times \vec{BC}|}{|\vec{AC} \times \vec{BC}|} \qquad b = \frac{|\vec{PA} \times \vec{CA}|}{|\vec{BA} \times \vec{CA}|} \qquad c = \frac{|\vec{PB} \times \vec{AB}|}{|\vec{CB} \times \vec{AB}|}$$

These equations can be evaluated (in the formulas shown below, all variables are in screen space):

$$a = \frac{1}{k}\left[(x - C_x)(B_y - C_y) - (y - C_y)(B_x - C_x)\right]$$

$$b = \frac{1}{k}\left[(x - A_x)(C_y - A_y) - (y - A_y)(C_x - A_x)\right]$$

$$c = \frac{1}{k}\left[(x - B_x)(A_y - B_y) - (y - B_y)(A_x - B_x)\right]$$

where $A_y$, $B_y$, $C_y$ are the y coordinates of the triangle in screen space

The derivatives of the barycentric coordinates can be computed:

$$\frac{\delta a}{\delta x} = \frac{1}{k}(B_y - C_y) \qquad \frac{\delta b}{\delta x} = \frac{1}{k}(C_y - A_y) \qquad \frac{\delta c}{\delta x} = \frac{1}{k}(A_y - B_y)$$

$$\frac{\delta a}{\delta y} = \frac{1}{k}(B_x - C_x) \qquad \frac{\delta b}{\delta y} = \frac{1}{k}(C_x - A_x) \qquad \frac{\delta c}{\delta y} = \frac{1}{k}(A_x - B_x)$$

Note that these values are constant independent of position, or, stated another way, the second derivatives are all zero.

The perspective corrected barycentric coordinates are given by:

$$a^* = \left(\frac{1/W_A}{g}\right)a \qquad b^* = \left(\frac{1/W_B}{g}\right)b \qquad c^* = \left(\frac{1/W_C}{g}\right)c$$

FIGURE 3A where $1/W_A$, $1/W_B$, and $1/W_C$ are constants based on the location of the verticies of the triangle in eye space, and:

$$g = \frac{1}{W_P} = \frac{1}{W_A}a + \frac{1}{W_B}b + \frac{1}{W_C}c$$

It will become useful later to know that $$\frac{\delta g}{\delta x} = \frac{1}{W_A}\frac{\delta a}{\delta x} + \frac{1}{W_B}\frac{\delta b}{\delta x} + \frac{1}{W_C}\frac{\delta c}{\delta x}$$

$$\frac{\delta^2 g}{\delta x^2} = 0$$

Next, compute the derivatives of $a^*$, $b^*$, and $c^*$.

$$\frac{\delta a^*}{\delta x} = \frac{g(1/W_A)\frac{\delta a}{\delta x} - a(1/W_A)\frac{\delta g}{\delta x}}{g^2}$$

$$= \left(\frac{1/W_A}{g}\right)\frac{\delta a}{\delta x} - \left(\frac{1/W_A}{g^2}\right)a\frac{\delta g}{\delta x}$$

$$\frac{\delta b^*}{\delta x} = \left(\frac{1/W_B}{g}\right)\frac{\delta b}{\delta x} - \left(\frac{1/W_B}{g^2}\right)b\frac{\delta g}{\delta x}$$

$$\frac{\delta c^*}{\delta x} = \left(\frac{1/W_C}{g}\right)\frac{\delta c}{\delta x} - \left(\frac{1/W_C}{g^2}\right)c\frac{\delta g}{\delta x}$$

Finally, compute the second derivatives of of $a^*$, $b^*$, and $c^*$.

$$\frac{\delta^2 a^*}{\delta x^2} = \frac{g(1/W_A)\frac{\delta^2 a}{\delta x^2} - (1/W_A)\frac{\delta a}{\delta x}\frac{\delta g}{\delta x}}{g^2} - \frac{g^2(1/W_A)\frac{\delta}{\delta x}\left(a\frac{\delta g}{\delta x}\right) - (1/W_A)a\frac{\delta g}{\delta x}2g\frac{\delta g}{\delta x}}{g^4}$$

$$= -\frac{1/W_A}{g^2}\frac{\delta a}{\delta x}\frac{\delta g}{\delta x} - \frac{1/W_A}{g^2}\left(a\frac{\delta^2 g}{\delta x^2} + \frac{\delta g}{\delta x}\frac{\delta a}{\delta x}\right) + 2(1/W_A)\frac{a}{g^3}\left(\frac{\delta g}{\delta x}\right)^2$$

FIGURE 3B

$$= -2\frac{1/W_A}{g^2}\frac{\delta a}{\delta x}\frac{\delta g}{\delta x} + 2\frac{1/W_A}{g^3}a\left(\frac{\delta g}{\delta x}\right)^2$$

$$\frac{\delta^2 b^*}{\delta x^2} = -2\frac{1/W_B}{g^2}\frac{\delta b}{\delta x}\frac{\delta g}{\delta x} + 2\frac{1/W_B}{g^3}b\left(\frac{\delta g}{\delta x}\right)^2$$

$$\frac{\delta^2 c^*}{\delta x^2} = -2\frac{1/W_C}{g^2}\frac{\delta c}{\delta x}\frac{\delta g}{\delta x} + 2\frac{1/W_C}{g^3}c\left(\frac{\delta g}{\delta x}\right)^2$$

Assume there exists a function $f$ that can be interpolated in eye space by perspective corrected barycentric coordinates for a location in screen space:

$$f = a^* f_A + b^* f_B + c^* f_C$$

where $f_A$, $f_B$ and $f_C$ are the value of $f$ at the corresponding verticies of the triangle.

The derivative of $f$ with respect to $\chi$ is given by:

$$\frac{\delta f}{\delta x} = \frac{\delta a^*}{\delta x}f_A + \frac{\delta b^*}{\delta x}f_B + \frac{\delta c^*}{\delta x}f_C$$

$$= f_A\left[\left(\frac{1/W_A}{g}\right)\frac{\delta a}{\delta x} - \left(\frac{1/W_A}{g^2}\right)a\frac{\delta g}{\delta x}\right] +$$

$$f_B\left[\left(\frac{1/W_B}{g}\right)\frac{\delta b}{\delta x} - \left(\frac{1/W_B}{g^2}\right)b\frac{\delta g}{\delta x}\right] +$$

$$f_C\left[\left(\frac{1/W_C}{g}\right)\frac{\delta c}{\delta x} - \left(\frac{1/W_C}{g^2}\right)c\frac{\delta g}{\delta x}\right]$$

Next, evaluate the derivative at each of the verticies in the triangle.

$$\left.\frac{\delta f}{\delta x}\right|_{a=1} = f_A\left[\frac{1/W_A}{1/W_A}\frac{\delta a}{\delta x} - \frac{1/W_A}{(1/W_A)^2}\frac{\delta g}{\delta x}\right] + f_B\left[\frac{1/W_B}{1/W_A}\frac{\delta b}{\delta x}\right] + f_C\left[\frac{1/W_C}{1/W_A}\frac{\delta c}{\delta x}\right]$$

$$= f_A\left[\frac{\delta a}{\delta x} - \frac{1}{(1/W_A)}\frac{\delta g}{\delta x}\right] + f_B\left[\frac{1/W_B}{1/W_A}\frac{\delta b}{\delta x}\right] + f_C\left[\frac{1/W_C}{1/W_A}\frac{\delta c}{\delta x}\right]$$

FIGURE 3C

$$\left.\frac{\delta f}{\delta x}\right|_{b=1} = f_A\left[\frac{1/W_A}{1/W_B}\frac{\delta a}{\delta x}\right] + f_B\left[\frac{\delta b}{\delta x} - \frac{1}{(1/W_B)}\frac{\delta g}{\delta x}\right] + f_C\left[\frac{1/W_C}{1/W_B}\frac{\delta c}{\delta x}\right]$$

$$\left.\frac{\delta f}{\delta x}\right|_{c=1} = f_A\left[\frac{1/W_A}{1/W_C}\frac{\delta a}{\delta x}\right] + f_B\left[\frac{1/W_B}{1/W_C}\frac{\delta b}{\delta x}\right] + f_C\left[\frac{\delta c}{\delta x} - \frac{1}{(1/W_C)}\frac{\delta g}{\delta x}\right]$$

Finally, calculate the scaled sum of the derivatives evaluated at the verticies of the triangle.

$$\left(\frac{1/W_A}{g}\right)a*\left(\left.\frac{\delta f}{\delta x}\right|_{a=1}\right) + \left(\frac{1/W_B}{g}\right)b*\left(\left.\frac{\delta f}{\delta x}\right|_{b=1}\right) + \left(\frac{1/W_C}{g}\right)c*\left(\left.\frac{\delta f}{\delta x}\right|_{c=1}\right)$$

$$= f_A\left[1/W_A \frac{a*}{g}\frac{\delta a}{\delta x} - \frac{a*}{g}\frac{\delta g}{\delta x}\right] + f_B\left[1/W_B \frac{a*}{g}\frac{\delta b}{\delta x}\right] + f_C\left[1/W_C \frac{a*}{g}\frac{\delta c}{\delta x}\right]$$

$$+ f_A\left[1/W_A \frac{b*}{g}\frac{\delta a}{\delta x}\right] + f_B\left[1/W_B \frac{b*}{g}\frac{\delta b}{\delta x} - \frac{b*}{g}\frac{\delta g}{\delta x}\right] + f_C\left[1/W_C \frac{b*}{g}\frac{\delta c}{\delta x}\right]$$

$$+ f_A\left[1/W_A \frac{c*}{g}\frac{\delta a}{\delta x}\right] + f_B\left[1/W_B \frac{c*}{g}\frac{\delta b}{\delta x}\right] + f_C\left[1/W_C \frac{c*}{g}\frac{\delta c}{\delta x} - \frac{c*}{g}\frac{\delta c}{\delta x}\right]$$

$$= f_A\left[\frac{1/W_A}{g}\frac{\delta a}{\delta x}(a*+b*+c*) - \frac{1/W_A}{g^2}a\frac{\delta g}{\delta x}\right]$$

$$+ f_B\left[\frac{1/W_B}{g}\frac{\delta b}{\delta x}(a*+b*+c*) - \frac{1/W_B}{g^2}b\frac{\delta g}{\delta x}\right]$$

$$+ f_C\left[\frac{1/W_C}{g}\frac{\delta c}{\delta x}(a*+b*+c*) - \frac{1/W_C}{g^2}c\frac{\delta g}{\delta x}\right]$$

$$= \frac{\delta a*}{\delta x}f_A + \frac{\delta b*}{\delta x}f_B + \frac{\delta c*}{\delta x}f_C$$

$$= \frac{\delta f}{\delta x}$$

FIGURE 3D

Thus, the first derivative of $f$ can be computed from constants determined at the verticies of the triangle and the perspective correction factor.

A similar approach can be used to calculate the second derivative of $f$ with respect to $x$:

$$\frac{\delta^2 f}{\delta x^2} = \frac{\delta^2 a^*}{\delta x^2} f_A + \frac{\delta^2 b^*}{\delta x^2} f_B + \frac{\delta c^*}{\delta x^2} f_C$$

$$= f_A \left[ -2 \frac{1/W_A}{g^2} \frac{\delta a}{\delta x} \frac{\delta g}{\delta x} + 2 \frac{1/W_A}{g^3} a \left( \frac{\delta g}{\delta x} \right)^2 \right]$$

$$+ f_B \left[ -2 \frac{1/W_B}{g^2} \frac{\delta b}{\delta x} \frac{\delta g}{\delta x} + 2 \frac{1/W_B}{g^3} b \left( \frac{\delta g}{\delta x} \right)^2 \right]$$

$$+ f_C \left[ -2 \frac{1/W_C}{g^2} \frac{\delta c}{\delta x} \frac{\delta g}{\delta x} + 2 \frac{1/W_C}{g^3} c \left( \frac{\delta g}{\delta x} \right)^2 \right]$$

Next, evaluate the derivative at each of the verticies in the triangle.

$$\left. \frac{\delta^2 f}{\delta x} \right|_{a=1} = f_A \left[ -2 \frac{1/W_A}{(1/W_A)^2} \frac{\delta a}{\delta x} \frac{\delta g}{\delta x} + 2 \frac{1/W_A}{(1/W_A)^3} \left( \frac{\delta g}{\delta x} \right)^2 \right]$$

$$+ f_B \left[ -2 \frac{1/W_B}{(1/W_A)^2} \frac{\delta b}{\delta x} \frac{\delta g}{\delta x} \right] + f_C \left[ -2 \frac{1/W_C}{(1/W_A)^2} \frac{\delta c}{\delta x} \frac{\delta g}{\delta x} \right]$$

$$\left. \frac{\delta^2 f}{\delta x^2} \right|_{b=1} = f_A \left[ -2 \frac{1/W_A}{(1/W_B)^2} \frac{\delta a}{\delta x} \frac{\delta g}{\delta x} \right] + f_B \left[ -2 \frac{1/W_B}{(1/W_B)^2} \frac{\delta b}{\delta x} \frac{\delta g}{\delta x} + 2 \frac{1/W_B}{(1/W_B)^3} \left( \frac{\delta g}{\delta x} \right)^2 \right]$$

$$+ f_C \left[ -2 \frac{1/W_C}{(1/W_B)^2} \frac{\delta c}{\delta x} \frac{\delta g}{\delta x} \right]$$

$$\left. \frac{\delta^2 f}{\delta x^2} \right|_{c=1} = f_A \left[ -2 \frac{1/W_A}{(1/W_C)^2} \frac{\delta a}{\delta x} \frac{\delta g}{\delta x} \right] + f_B \left[ -2 \frac{1/W_B}{(1/W_C)^2} \frac{\delta b}{\delta x} \frac{\delta g}{\delta x} \right]$$

FIGURE 3E

$$+ f_C \left[ -2 \frac{1/W_C}{(1/W_C)^2} \frac{\delta c}{\delta x} \frac{\delta g}{\delta x} + -2 \frac{1/W_C}{(1/W_C)^3} \left( \frac{\delta g}{\delta x} \right)^2 \right]$$

Finally, calculate the scaled sum of the derivatives evaluated at the verticies of the triangle.

$$\left( \frac{1/W_A}{g} \right)^2 a * \left( \frac{\delta^2 f}{\delta x^2} \bigg|_{a=1} \right) + \left( \frac{1/W_B}{g} \right)^2 b * \left( \frac{\delta^2 f}{\delta x^2} \bigg|_{b=1} \right) + \left( \frac{1/W_C}{g} \right)^2 \left( \frac{\delta^2 f}{\delta x^2} \bigg|_{c=1} \right)$$

$$= \left( \frac{1/W_A}{g} \right)^2 a * f_A \left[ -2 \frac{1/W_A}{(1/W_A)^2} \frac{\delta a}{\delta x} \frac{\delta g}{\delta x} + 2 \frac{1/W_A}{(1/W_A)^3} \left( \frac{\delta g}{\delta x} \right)^2 \right]$$

$$+ f_B \left[ -2 \frac{1/W_B}{(1/W_A)^2} \frac{\delta b}{\delta x} \frac{\delta g}{\delta x} \right] + f_C \left[ -2 \frac{1/W_C}{(1/W_A)^2} \frac{\delta c}{\delta x} \frac{\delta g}{\delta x} \right]$$

$$+ \left( \frac{1/W_B}{g} \right)^2 b * f_A \left[ -2 \frac{1/W_A}{(1/W_B)^2} \frac{\delta a}{\delta x} \frac{\delta g}{\delta x} \right] + f_B \left[ -2 \frac{1/W_B}{(1/W_B)^2} \frac{\delta b}{\delta x} \frac{\delta g}{\delta x} + 2 \frac{1/W_B}{(1/W_B)^3} \left( \frac{\delta g}{\delta x} \right)^2 \right]$$

$$+ f_C \left[ -2 \frac{1/W_C}{(1/W_B)^2} \frac{\delta c}{\delta x} \frac{\delta g}{\delta x} \right]$$

$$+ \left( \frac{1/W_C}{g} \right)^2 c * f_A \left[ -2 \frac{1/W_A}{(1/W_C)^2} \frac{\delta a}{\delta x} \frac{\delta g}{\delta x} \right] + f_B \left[ -2 \frac{1/W_B}{(1/W_C)^2} \frac{\delta b}{\delta x} \frac{\delta g}{\delta x} \right]$$

$$+ f_C \left[ -2 \frac{1/W_C}{(1/W_C)^2} \frac{\delta c}{\delta x} \frac{\delta g}{\delta x} + 2 \frac{1/W_C}{(1/W_C)^3} \left( \frac{\delta g}{\delta x} \right)^2 \right]$$

$$= a * f_A \left[ -2 \frac{1/W_A}{g^2} \frac{\delta a}{\delta x} \frac{\delta g}{\delta x} + 2 \frac{1}{g^2} \left( \frac{\delta g}{\delta x} \right)^2 \right] + a * f_B \left[ -2 \frac{1/W_B}{g^2} \frac{\delta b}{\delta x} \frac{\delta g}{\delta x} \right] + a * f_C \left[ -2 \frac{1/W_C}{g^2} \frac{\delta c}{\delta x} \frac{\delta g}{\delta x} \right]$$

$$+ b * f_A \left[ -2 \frac{1/W_A}{g^2} \frac{\delta a}{\delta x} \frac{\delta g}{\delta x} \right] + b * f_B \left[ -2 \frac{1/W_B}{g^2} \frac{\delta b}{\delta x} \frac{\delta g}{\delta x} + 2 \frac{1}{g^2} \left( \frac{\delta g}{\delta x} \right)^2 \right] + b * f_C \left[ -2 \frac{1/W_C}{g^2} \frac{\delta c}{\delta x} \frac{\delta g}{\delta x} \right]$$

$$+ c * f_A \left[ -2 \frac{1/W_A}{g^2} \frac{\delta a}{\delta x} \frac{\delta g}{\delta x} \right] + c * f_B \left[ -2 \frac{1/W_B}{g^2} \frac{\delta b}{\delta x} \frac{\delta g}{\delta x} \right] + c * f_C \left[ -2 \frac{1/W_C}{g^2} \frac{\delta c}{\delta x} \frac{\delta g}{\delta x} + 2 \frac{1}{g^2} \left( \frac{\delta g}{\delta x} \right)^2 \right]$$

FIGURE 3F

$$= f_A \left( -2 \frac{1/W_A}{g^2} \frac{\delta a}{\delta x} \frac{\delta g}{\delta x} (a*+b*+c*) + 2 \frac{1/W_A}{g^3} \left(\frac{\delta g}{\delta x}\right)^2 \right)$$

$$+ f_B \left( -2 \frac{1/W_B}{g^2} \frac{\delta a}{\delta x} \frac{\delta g}{\delta x} (a*+b*+c*) + 2 \frac{1/W_A}{g^3} \left(\frac{\delta g}{\delta x}\right)^2 \right)$$

$$+ f_C \left( -2 \frac{1/W_A}{g^2} \frac{\delta a}{\delta x} \frac{\delta g}{\delta x} (a*+b*+c*) + 2 \frac{1/W_A}{g^3} \left(\frac{\delta g}{\delta x}\right)^2 \right)$$

$$= \frac{\delta^2 a*}{\delta x^2} f_A + \frac{\delta^2 b*}{\delta x^2} f_B + \frac{\delta^2 c*}{\delta x^2} f_C$$

$$= \frac{\delta^2 f}{\delta x^2}$$

Thus, the second derivative of $f$ can be computed from constants determined at the verticies of the triangle and the perspective correction factor.

FIGURE 3G

METHOD AND SYSTEM FOR EVALUATING DERIVATIVES IN SCREEN SPACE USING PERSPECTIVE CORRECTED BARYCENTRIC COORDINATES

BACKGROUND OF THE INVENTION

1. Field of the Invention

The present invention relates to computer graphics technology. More specifically, the present invention relates to the evaluation of derivatives in screen space during graphics processing.

2. Related Art

Computer systems are extensively used to perform a wide variety of useful operations in modern society. Applications of computer systems can be found in virtually all fields and disciplines, including but not limited to business, industry, scientific research, education and entertainment. For instance, computer systems are used to analyze financial data, to control industrial machinery, to model chemical molecules, to deliver classroom presentations and to generate special effects for movies. Indeed, it has now come to the point where many of these operations have become so computationally intensive that they cannot be efficiently performed without the help of modern computer systems. As part of the process of performing such operations, computer systems typically utilize some type of display device, such as a cathode ray tube (CRT), a liquid crystal display (LCD) and the like, in order to display images and data which are recognizable to their users. As such, computer systems typically incorporate functionality for generating images and data which are subsequently output to the display device.

One technique for generating computer images and viewable data within a computer system is to utilize a graphics pipeline, which uses a series of interconnected functional blocks of circuitry, or "stages", to render an image. Each stage performs a unique task during each clock cycle. As soon as one stage has completed its task on a point (e.g., a pixel), that stage can immediately proceed to work on the next one. It does not have to wait for the processing of a prior pixel to complete before it can begin processing the current pixel. More specifically, sets of graphics primitives (e.g., triangles) are specified within the computer system and are subsequently sent down the graphics pipeline. Each stage sequentially performs a different function or functions on the received graphics primitives and then passes that data onto the following stage. Eventually, the graphics pipeline manipulates the graphics primitives in order to produce the final pixel values of an image. Thus, a graphics pipeline enables different graphics data to be processed concurrently, thereby generating graphics images at a higher rate. It should be appreciated that the functionality of a typical prior art graphics pipeline is well known by those of ordinary skill in the art.

One typical operation that is performed during graphics processing is texture mapping. Moreover, texture mapping generally involves the determination of the level of detail (LOD) at each point (e.g., a pixel) of the object (e.g., a triangle primitive) being texture mapped. In the prior art, the LOD of a given pixel is computed using various local difference techniques. In particular, one prior art implementation computes the LOD at a given pixel using differences in texture coordinates S and T of several adjacent pixels. For example, a typical prior art LOD computation uses four adjacent pixels (e.g., the four pixels form a two-by-two grid, or quad, within the triangle primitive being processed) to determine an LOD value, which is then applied to all four of the pixels. In other words, the LOD value that results is merely an approximation and is inexact with respect to each individual pixel. In most cases, such prior art implementation is subject to artifacts because each LOD computation is biased towards a certain direction depending on the manner in which the differences are computed and the location of the pixels within the primitive. Thus, it would be advantageous to provide a method and system for computing the LOD that can yield more accurate results and minimize the artifacts described above.

Moreover, in the prior art, the LOD at any given pixel is dependent upon the texture coordinates of its neighboring pixels. More specifically, since the LOD value is based upon the differences in the texture coordinates of adjacent pixels, the computation of the LOD requires that the texture coordinates of the pixels involved be calculated first. Due to the requirement that texture coordinates must be computed prior to LOD computations, the level of parallel processing in the graphics pipeline is significantly restricted. As such, this prior art implementation of LOD computation adversely impacts the efficiency of the graphics pipeline and thus lowers the overall performance of the computer system. Therefore, it would be beneficial to provide a method and system for computing the LOD that does not require the texture coordinates of adjacent pixels be first calculated such that the efficiency of the graphics pipeline as well as the overall performance of the computer system can be enhanced.

In summary, it would be highly advantageous to provide a method and system for computing the LOD that can yield more accurate results and minimize the artifacts associated with the prior art as described above. Moreover, it would also be advantageous to provide a method and system for computing the LOD that does not require the texture coordinates of adjacent pixels be first calculated such that the efficiency of the graphics pipeline and the overall performance of the computer system can be enhanced.

SUMMARY OF THE INVENTION

Accordingly, the present invention provides a method and system for computing the LOD at each point directly without having to rely on approximations. Such direct computation of the LOD for individual pixels in accordance with the present invention allows the exact LOD values to be easily computed and eliminates the artifacts that are inherent in prior art implementations. Moreover, the present invention provides a method and system for computing the LOD that does not require the texture coordinates of adjacent pixels as inputs. Thus, the present invention enables a higher level of parallel processing in the graphics pipeline, thereby greatly enhancing the efficiency and performance of the graphics pipeline and the computer system as a whole. These and other advantages of the present invention not specifically mentioned above will become clear within discussions of the present invention presented herein.

More specifically, a currently preferred embodiment of the present invention provides a method for computing the LOD at individual pixels directly during texture mapping. In this embodiment, screen coordinates of a pixel and texture coordinates of vertices of the triangle enclosing the pixel are determined. Derivatives of texture coordinates at the pixel with respect to screen space are evaluated by interpolation using barycentric coordinates of the pixel. Then, using the derivatives of the texture coordinates and without relying on neighboring pixels' texture coordinates, the LOD at the pixel is computed, such that the LOD as computed is unbiased in any particular direction. Significantly, in accordance with the present invention, exact LOD values, rather than approximations based on local differences, are computed. This eliminates the artifacts that are inherent in prior art implementations such as those based on local differences techniques. This embodiment also enables a higher level of parallel processing by eliminating the need to compute texture coordinates prior to computing LOD, thereby enhancing system performance. Alternative embodiments of the present invention provide a computer system upon which the method of the present invention can be practiced. Moreover, in one embodiment, a triangular bilinear interpolator and a multiplier are included as part of the system hardware for performing the direct derivative computations in accordance with the present invention.

Yet another embodiment provides a method for computing derivatives of a function with respect to screen space, for any function that can be interpolated in eye space by perspective corrected barycentric coordinates for a point in screen space. The method of this embodiment can be used to evaluated any $n^{th}$-order derivative where n is a positive integer. In this embodiment, coordinates of a triangle's vertices in screen space are identified, where the triangle includes the point at which the derivatives are to be evaluated. Barycentric coordinates of the point, which specify a location of the point relative to the vertices of the triangle, are determined. Perspective correction factors for the point based on the coordinates of the vertices are also generated. The derivatives of the function are then expressed in interpolated form using the perspective correction factors, the barycentric coordinates of the point and values of the derivatives at the vertices. Finally, the derivatives are evaluated at the point using the interpolated equation such that the derivatives can be computed independently for that point without relying on data from neighboring points.

BRIEF DESCRIPTION OF THE DRAWINGS

The accompanying drawings, which are incorporated in and form a part of this specification, illustrate embodiments of the invention and, together with the description, serve to explain the principles of the invention:

FIGS. 3A, 3B, 3C, 3D, 3E, 3F, and 3G are diagrams containing the mathematical proof that supports the validity of the derivative computation method and system in accordance with embodiments of the present invention.

DETAILED DESCRIPTION OF THE INVENTION

Figure 1:
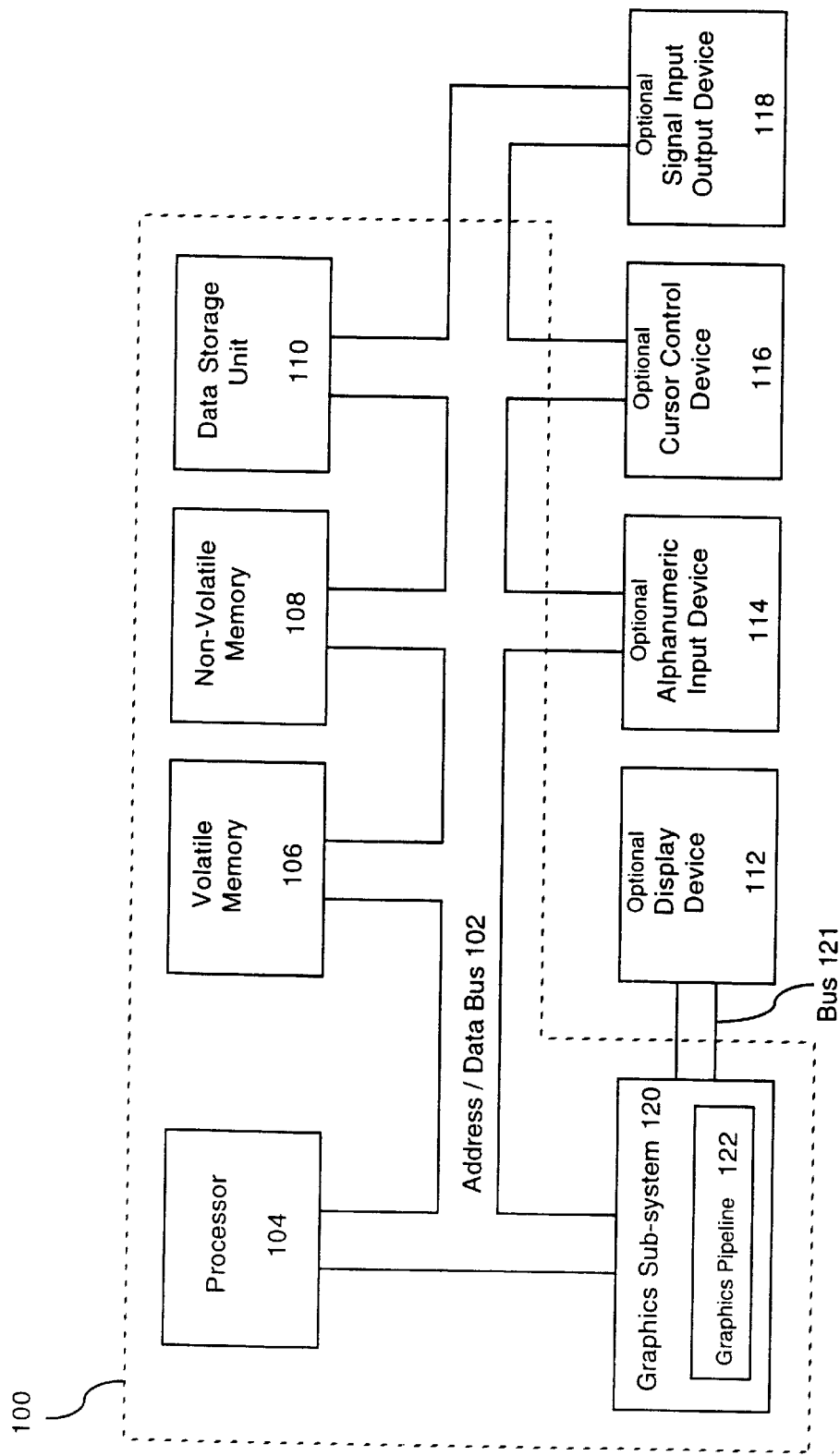
FIG. 1 is a schematic illustration of an exemplary computer system used in accordance with embodiments of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. To the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "identifying", "determining", "generating", "expressing", "computing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for-example, optical and mechanical computers.

COMPUTER SYSTEM ENVIRONMENT IN WHICH EMBODIMENTS OF THE PRESENT INVENTION CAN BE PRACTICED

Figure 4:
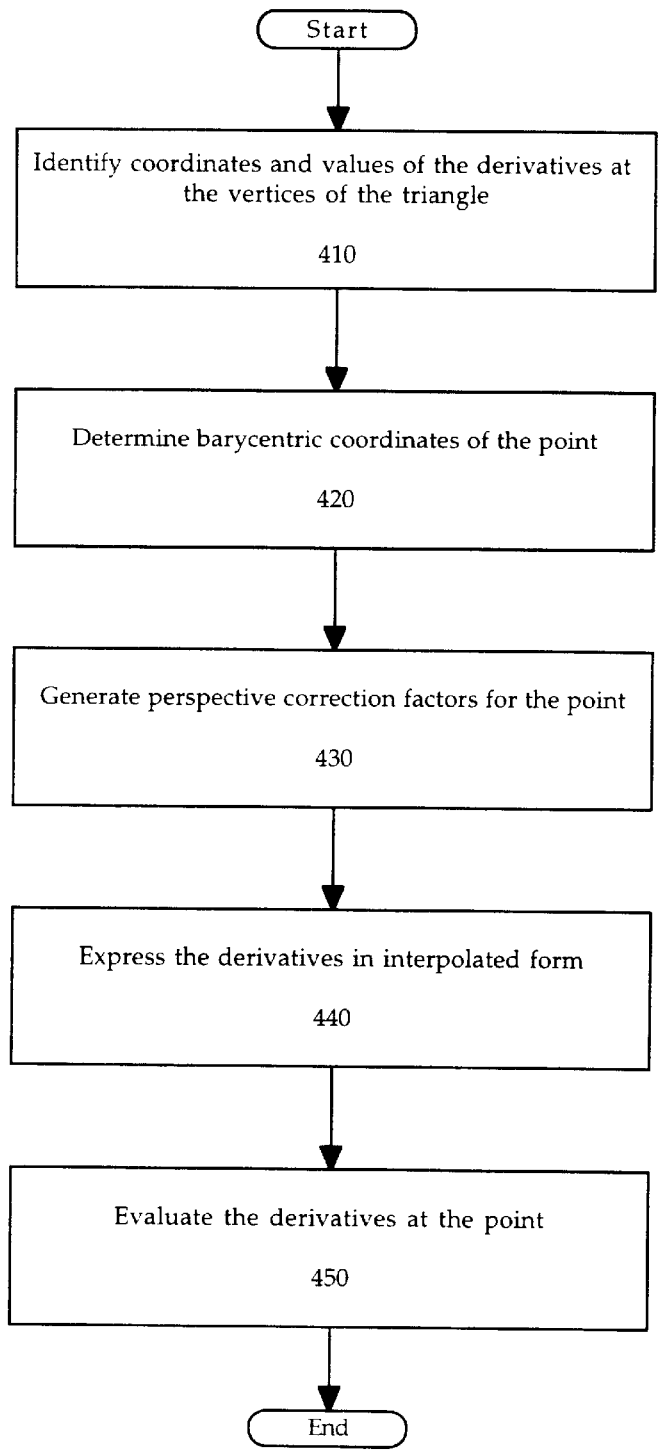
FIG. 4 is a flow diagram illustrating steps for computing derivatives of a function with respect to screen space in accordance with one embodiment of the present invention.
Figure 5:
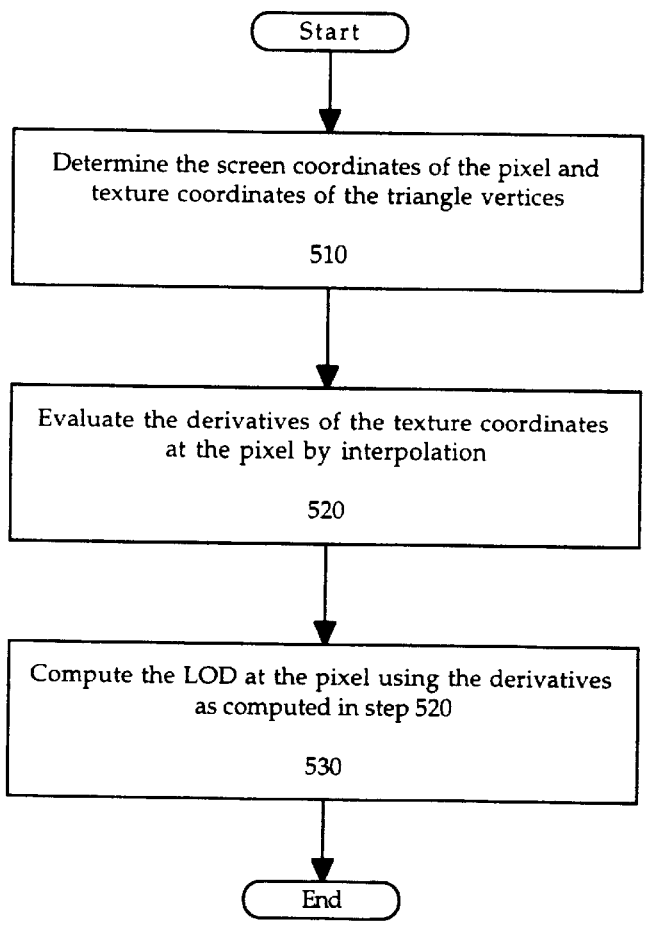
FIG. 5 is a flow diagram illustrating steps for computing the level of detail (LOD) at a pixel in a triangle during texture mapping in accordance with one embodiment of the present invention.

FIG. 1 illustrates an exemplary computer system 100 used in accordance with embodiments of the present invention. Within the following discussions of the present invention, certain processes and steps are discussed that are realized, in certain embodiments, as a series of computer-readable and computer-executable instructions (e.g., processes 400 and 500 as illustrated in FIGS. 4 and 5, respectively) that reside, for example, in computer-usable media of computer system 100 and executed by processor(s) of computer system 100.

When executed, the instructions cause computer system 100 to perform specific actions and exhibit specific behavior which is described in detail below. It is appreciated that system 100 of FIG. 1 is exemplary only and that the present invention can operate within a number of different computer systems including general purpose computer systems, embedded computer systems, and stand-alone computer systems specially adapted for graphics applications.

Computer system 100 of FIG. 1 includes an address/data bus 102 for communicating information, and a central processor unit (CPU) 104 coupled to bus 102 for processing information and instructions. Within the scope of the present invention, processor 104 can be a specialized processor that is optimized for performing graphics operations. Computer system 100 also includes data storage features such as a computer-usable volatile memory 106, (e.g., random access memory (RAM)) coupled to bus 102 for storing information and instructions for central processor unit 104, computer-usable non-volatile memory 108 (e.g., read only memory (ROM)) coupled to bus 102 for storing static information and instructions for central processor unit 104, and a data storage device 110 (e.g., a magnetic or optical disk and disk drive) coupled to bus 102 for storing information and instructions. Optionally, computer system 100 may also include a display device 112 coupled to bus 102 for displaying information (e.g., graphics images), an alphanumeric input device 114 having alphanumeric and function keys and coupled to bus 102 for communicating information and command selections to central processor unit 104, a cursor control device 116 coupled to bus 102 for communicating user input information and command selections to central processor unit 104, and also a signal input output communication device 118 (e.g., a modem) coupled to bus 102.

Display device 112 of FIG. 1, utilized with the present invention, may be a liquid crystal device (LCD), cathode ray tube (CRT), or other display device suitable for creating graphic images and alphanumeric characters recognizable to a user. Optional cursor control device 116 allows the computer user to dynamically signal the two dimensional movement of a visible symbol (cursor) on a display screen of display device 112. Many implementations of cursor control device 116 are known in the art including a trackball, mouse, touch pad or joystick. Alternatively, it will be appreciated that a cursor can be directed and/or activated via input from alphanumeric input device 114 using special keys and key sequence commands. The present invention is also well suited to directing a cursor by other means such as, for example, voice commands.

Computer system 100 of FIG. 1 also provides data and control signals via bus 102 to a graphics sub-system 120. Graphics sub-system 120 contains a graphics pipeline 122, which includes specialized hardware units for processing a series of display instructions found within a memory-stored display list to render graphics primitives. Graphics pipeline 122 supplies data and control signals to a frame buffer (not shown) that refreshes display device 112 for rendering images (including graphics images). Graphics sub-system 120 is coupled to display device 112 by an address/data bus 121, which enables them to communicate information. A more detailed discussion of the operation of specific features of graphics sub-system 120 of the present invention is found below with reference to FIGS. 2, 3, 4 and 5.

GENERAL DESCRIPTION OF CERTAIN EMBODIMENTS OF THE PRESENT INVENTION

Figure 2:
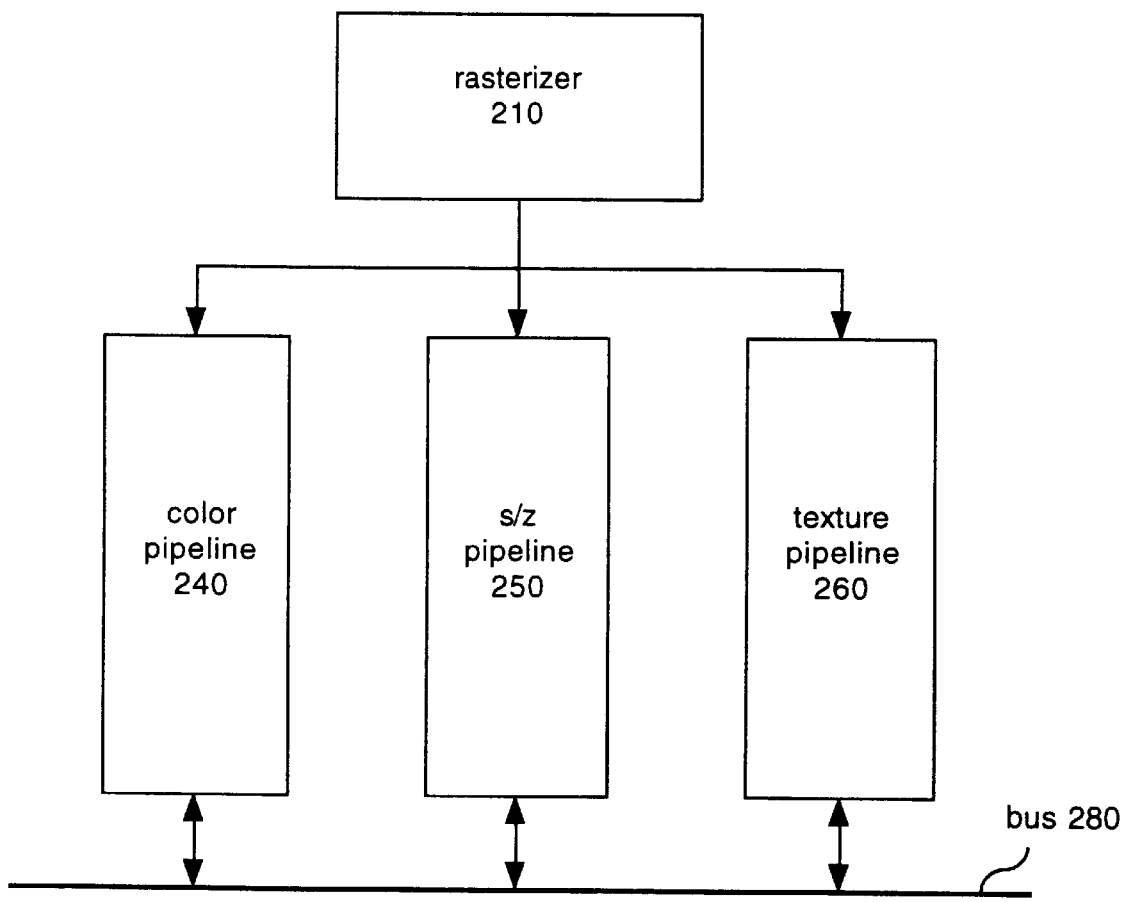
FIG. 2 is a block diagram illustrating the configuration of a graphics sub-system in accordance with one embodiment of the present invention.

With reference next to FIG. 2, a block diagram illustrating the configuration of a graphics sub-system in accordance with one embodiment of the present invention is shown. As shown in FIG. 2, in one embodiment of the present invention, graphics sub-system 120 comprises a rasterizer 210. Within the scope of the present invention, rasterizer 210 traverses graphics primitives, such as triangles and lines, to generate information for the corresponding pixels, including their coordinates. Rasterizer 210 is generally coupled to various pipelines, each of which handles a certain aspect of graphics processing. For example, as illustrated in FIG. 2, rasterizer 210 is coupled to a color pipeline 240, a stencil z-buffer pipeline (s/z pipeline) 250 and a texture pipeline 260. In one embodiment, each of color pipeline 240, s/z pipeline 250 and texture pipeline 260 receives coordinates of pixels from rasterizer 210 for further processing according to commands from processor 104. Moreover, in one embodiment, each of color pipeline 240, s/z pipeline 250 and texture pipeline 260 is independently coupled to a bus 280 for communicating information therewith.

In embodiments of the present invention, graphics sub-system 120 includes a triangular bilinear interpolator (not shown) and a multiplier (not shown), which are used to perform derivative computations in accordance with the present invention, the details of which are described further below. the graphics art, it is appreciated that for any function f which can be interpolated in eye space from constants at the vertices of a triangle, the value of f for a location in the triangle (e.g., a point on or bounded by the edges of the triangle) in screen space can be calculated by interpolating such constants with perspective corrected barycentric coordinates. It is noted that the use of barycentric coordinates and applying perspective correction thereto is well known in the graphics art. Significantly, the present invention further appreciates that for such a function f, its derivative with respect to screen space coordinates can also be computed by interpolating constants at the vertices of the triangle in eye space and applying the perspective barycentric coordinates multiple times, where the exact number of times is dependent upon the order of the derivatives that are to be calculated. As a specific example, within the scope of the present invention, it is shown that the firstorder derivative of function f with respect to screen space coordinates can be computed by interpolating constants at the vertices of the triangle in eye space and applying the perspective barycentric coordinates twice. Likewise, as another example, it is shown within the scope of the present invention that the second-order derivative of function f with respect to screen space coordinates can be computed by interpolating constants at the vertices of the triangle in eye space and applying the perspective barycentric coordinates three times.

More generally, the present invention appreciates that any $n^{th}$-order derivative, where n is a positive integer, can be computed by interpolating constants at the vertices of the triangle in eye space and applying the perspective barycentric coordinates (n+1) times. A detailed mathematical proof that supports the validity of the derivative computation method and system in accordance with embodiments of the present invention is presented in FIGS. 3A, 3B, 3C, 3D, 3E, 3F, and 3G.

Based upon the foregoing discussion, the present invention further appreciates that the texture coordinates at a given point in screen space, typically denoted as S and T in the graphics art, are examples of functions with characteristics identical to function f described above. More specifically, the values of S and T for a given point in screen space can be evaluated by interpolating the S and T values at the vertices of a triangle, which encloses the point in question, with the perspective corrected barycentric coordinates. Thus, in accordance with the present invention, the first-order derivatives of S and T in screen space can be directly evaluated at a given point in screen space by applying the perspective correction factor twice to the interpolated derivatives from the vertices of the triangle. In a currently preferred embodiment, the computer system in accordance with the present invention includes a triangular bilinear interpolator and a multiplier for evaluating the derivatives of the texture coordinates.

In particular, the above described method and system for direct computation of derivatives of the texture coordinates can be advantageously applied to the determination of the level of detail (LOD) at each point (e.g., a pixel), a typical operation that is performed during texture mapping. Since the LOD at a given point is a function of the derivatives of the texture coordinates evaluated at that point, the LOD can readily be computed once the values of the derivatives of the texture coordinates are available. Importantly, by computing the derivatives of the texture coordinates as described above and then applying the results to determine the LOD at a given point, the present invention provides an exact value which accurately represents the proper LOD at the point in question. Furthermore, the LOD value so calculated is not biased towards any particular direction, irrespective of the particular orientation of the triangle being processed and the location of the pixel within the triangle. As such, the present invention completely eliminates from the resulting images those undesirable artifacts that results from the location of the samples used to compute local differences in the prior art. Rather, each pixel has its own independent and exact LOD value, which is not an approximation based on adjacent pixels. Thus, embodiments of the present invention provide a method and system for computing the LOD that yield superior results to those generated by prior art approaches.

Moreover, unlike the prior art, the computation of the LOD at a pixel is not dependent upon the differences in the texture coordinates of adjacent pixels according to the present invention, as the LOD are readily computed from the values of the derivatives of the texture coordinates at that pixel and the derivatives are directly evaluated as described above. Therefore, the computation of the texture coordinates and the LOD of a pixel can be performed in parallel. Likewise, since the computation of the LOD at a given pixel is not dependent upon the texture coordinates of its neighboring pixels, the LOD of neighboring pixels can also be computed in parallel. Thus, the restrictions imposed by the prior art approach on the level of parallel processing in the graphics pipeline is eliminated by applying the direct computation of the present invention. As such, the efficiency of the graphics pipeline as well as the overall performance of the computer system is significantly enhanced by implementing the direct computation of derivatives in accordance with the present invention.

DESCRIPTION OF THE OPERATION OF CERTAIN EMBODIMENTS OF THE PRESENT INVENTION

Referring next to FIG. 4, a flow diagram 400 illustrating steps for computing derivatives of a function with respect to screen space in accordance with one embodiment of the present invention is shown. As described above, it is appreciated that the function whose derivatives are to be computed is capable of being interpolated in eye space by perspective corrected barycentric coordinates for a point in screen space.

Thus, referring to FIG. 4, in step 410, coordinates and values of the derivative (of the function) at the vertices of a triangle in screen space are identified, where the triangle includes the point at which the derivatives are to be evaluated.

With reference still to FIG. 4, in step 420, barycentric coordinates of the point in question are determined. It is appreciated that the barycentric coordinates specify a location of the point relative to the vertices of the triangle as described above and as defined in FIG. 3A.

Referring still to FIG. 4, in step 430, perspective correction factors for the point are generated based on the coordinates of the vertices, as described above and with reference to FIGS. 3A–3G.

With reference again to FIG. 4, in step 440, the derivatives of the function are expressed in interpolated form using the perspective correction factors generated in step 430, the barycentric coordinates of the point as determined in step 420 and values of the derivatives at the vertices. The interpolated form of the derivatives are illustrated in detail with reference to FIGS. 3A, 3B, 3C and 3D.

Referring still to FIG. 4, in step 450, the derivatives are evaluated at the point in question using the interpolated equation arrived at in step 440 such that the derivatives can be computed independently for that point without relying on data from neighboring points.

It is appreciated that process 400 has numerous applications within the graphics art. In one specific embodiment, the derivatives of the function with respect to screen space are first-order derivatives and are used to compute the level of detail (LOD) at the point at which the derivatives are evaluated. This embodiment is described further with reference to FIG. 5 below. In another embodiment, the derivatives of the function with respect to screen space are second-order derivatives and are used to compute the surface curvature at the point at which the derivatives are evaluated. It should further be appreciated that process 400 of FIG. 4 is not limited to the particular embodiments and applications described herein. Rather, process 400 is well suited for use in the computation of the $n^{th}$-order derivatives of the function with respect to screen space where n is any positive integer, which have different applicability in graphics processing that would be clear to one skilled in the graphics art. Such different applications of process 400 of FIG. 4 is within the scope and spirit of the present invention.

Referring next to FIG. 5, a flow diagram 500 illustrating steps for computing the level of detail (LOD) at a pixel in a triangle during texture mapping in accordance with one embodiment of the present invention is shown. In one embodiment, texture mapping is performed using texture pipeline 260 (FIG. 2) of graphics sub-system 120.

Thus, with reference to FIG. 5, in step 510, screen coordinates of the pixel and texture coordinates of vertices of the triangle that encloses the pixel are determined. It is appreciated that the determination of screen coordinates and texture coordinates are known in the art and thus not described in detail herein. In one embodiment, the texture coordinates of vertices of the triangle that encloses the pixel are provided as inputs.

Referring still to FIG. 5, in step 520, derivatives of texture coordinates are evaluated at the pixel with respect to screen space by interpolation using barycentric coordinates of the pixel. In one embodiment, process 400 of FIG. 4 as described above is used to perform step 520.

More specifically, in one embodiment, step 520 is implemented as follows: three constants specific to the triangle, each of which is computed based on a vertex of the triangle, are computed. Perspective correction factors for the pixel are then computed using the three constants. The derivatives of the texture coordinates are evaluated at the pixel with respect to screen space by interpolating the derivatives of the texture coordinates at the vertices using the perspective correction factors and the barycentric coordinates. In a currently preferred embodiment, step 520 includes a triangular bilinear interpolation and a multiplication With reference again to FIG. 5, in step 530, the LOD at the pixel is computed using the derivatives of the texture coordinates as evaluated in step 520, where the LOD of the pixel is computed independent of texture coordinates of neighboring pixels, such that the LOD thus computed is unbiased in any particular direction. Significantly, such direct computation allows exact LOD values to be easily computed and eliminates the artifacts that are inherent in prior art implementations employing local difference techniques. This embodiment also enables a higher level of parallel processing by eliminating the prerequisite of computing texture coordinates before computing LOD, thereby enhancing system performance.

In one embodiment, the derivatives of the texture coordinates at the pixel with respect to screen space are first-order derivatives and the perspective correction factors are applied to the respective barycentric coordinates twice in the interpolation. Moreover, in one embodiment, the derivatives of the texture coordinates are applicable to computations in MIP-mapping, RIP-mapping and footprint assembly operations.

Importantly, as described above, embodiments of the present invention enable the computation of the texture coordinates and step 520 to be performed concurrently. Similarly, LOD computation for neighboring pixels can be performed in parallel. By computing the LOD without requiring the texture coordinates of adjacent pixels as inputs, embodiments of the present invention enable a higher level of parallel processing in the graphics pipeline, thereby greatly enhancing the efficiency and performance of the graphics pipeline and the computer system as a whole.

The preferred embodiment of the present invention, a method and system for evaluating derivatives in screen space using perspective corrected barycentric coordinates, is thus described. While the present invention has been described in particular embodiments, it should be appreciated that the present invention should not be construed as limited by such embodiments, but rather construed according to the below claims.

What is claimed is:

1. In a graphics computer system, a method for computing the level of detail (LOD) at a pixel in a triangle during texture mapping, the method comprising the steps of:
   a) determining screen coordinates on the pixel and derivatives of the texture coordinates at the vertices of the triangle;
   b) evaluating derivatives of texture coordinates at the pixel with respect to screen space by interpolation of the derivatives of the texture coordinates at the vertices using barycentric coordinates of the pixel; and
   c) computing the LOD at the pixel using the derivatives of the texture coordinates at the pixel, the LOD of the pixel being computed independent of texture coordinates of neighboring pixels;
      wherein the LOD as computed by said step c) is unbiased in any particular direction.

2. The method as recited in claim 1 wherein said step b) can be accomplished by a triangular bilinear interpolation and a multiplication.

3. The method as recited in claim 1 wherein said step b) comprises the steps of:
   b1) computing three constants specific to the triangle, each of the three constants being computed based on a vertex of the triangle;
   b2) computing perspective correction factors for the pixel using the three constants; and
   b3) evaluating the derivatives of the texture coordinates at the pixel with respect to screen space by interpolating the derivatives of the texture coordinates at the vertices using the perspective correction factors and the barycentric coordinates.

4. The method as recited in claim 3 wherein the derivatives of the texture coordinates at the pixel with respect to screen space are first-order derivatives and the perspective correction factors are applied to the respective barycentric coordinates twice in the interpolation.

5. The method as recited in claim 1 wherein the derivatives of the texture coordinates at the pixel with respect to screen space are applicable to computations in MIP-mapping, RIP-mapping and footprint assembly operations.

6. The method as recited in claim 1 wherein said step b) can be performed concurrently with the computation of the texture coordinates.

7. The method as recited in claim 1 wherein LOD computation for neighboring pixels can be performed in parallel.

8. A computer system capable of computing the level of detail (LOD) at a pixel in a triangle during texture mapping, the computer system comprising:
   a processor for issuing commands;
   a memory sub-system coupled to the processor for storing information including graphics data; and
   a graphics sub-system coupled to the processor and operations according to the commands from the processor, wherein the graphics sub-system is configured to determine screen coordinates of the pixel and derivatives of the texture coordinates at the vertices of the triangles; the graphics sub-system is also configured to evaluate derivatives of texture coordinates at the pixel with respect to screen space by interpolation of the derivatives of the texture coordinates at the vertices using barycentric coordinates of the pixel; and the graphics sub-system is further configured to computer the LOD at the pixel using the derivatives of the texture coordinates at the pixel, the LOD of the pixel being computed independent of texture coordinates of neighboring pixels; such that the LOD as computed is unbiased in any particular direction.

9. The computer system as recited in claim 8 wherein the graphics sub-system comprises a triangular bilinear interpolator and a multiplier for evaluating the derivatives of the texture coordinates at the pixel with respect to screen space.

10. The computer system as recited in claim 8 wherein the graphics sub-system is also configured to compute three constants specific to the triangle, each of the three constants being computed based on a vertex of the triangle; the graphics sub-system is also configured to compute perspective correction factors for the pixel using the three constants; and the graphics subsystem is further configured to evaluate the derivatives of the texture coordinates at the pixel with respect to screen space by interpolating the derivatives of the texture coordinates at the vertices using the perspective correction factors and the barycentric coordinates.

11. The computer system as recited in claim 10 wherein the derivatives of the texture coordinates at the pixel with respect to screen space are first-order derivatives and the perspective correction factors are applied to the respective barycentric coordinates twice in the interpolation.

12. The computer system as recited in claim 8 wherein the graphics sub-system is further configured to apply the derivatives of the texture coordinates at the pixel with respect to screen space to perform computations in MIP-mapping, RIP-mapping and footprint assembly operations.

13. The computer system as recited in claim 8 wherein the graphics sub-system is further configured to perform the evaluation of the derivatives of the texture coordinates concurrently with the computation of the texture coordinates.

14. The computer system as recited in claim 8 wherein the graphics sub-system is further configured to perform LOD computation for neighboring pixels in parallel.

15. The computer system as recited in claim 8 wherein a display sub-system is coupled to the computer system for displaying graphics images according to the graphics data.

16. In a graphics computer system, a method for computing derivatives of a function with respect to screen space, the function capable of being interpolated in eye space by perspective corrected barycentric coordinates for a point in screen space, the method comprising the steps of:

a) identifying coordinates of vertices of a triangle in screen space, the triangle including the point at which the derivatives are to be evaluated;

b) determining barycentric coordinates of the point, the barycentric coordinates specifying a location of the point relative to the vertices of the triangle;

c) generating perspective correction factors for the point based on the coordinates of the vertices;

d) expressing the derivatives of the function in interpolated form using the perspective correction factors, the barycentric coordinates of the point and values of the derivatives at the vertices; and e) evaluating the derivatives at the point wherein the derivatives can be computed independently without relying on data from neighboring points.

17. The method as recited in claim 16 wherein said step e) can be accomplished by a triangular bilinear interpolation and a multiplication.

18. The method as recited in claim 16 wherein the derivatives of the function with respect to screen space are first-order derivatives and are used to compute the level of detail (LOD) at the point at which the derivatives are evaluated.

19. The method as recited in claim 16 wherein the derivatives of the function with respect to screen space are second-order derivatives and are used to compute the surface curvature at the point at which the derivatives are evaluated.

20. The method as recited in claim 16 wherein the derivatives of the function with respect to screen space are $n^{th}$-order derivatives where n is a positive integer.

* * * * *